United States Patent
Dahle et al.

US009234264B2

(10) Patent No.: US 9,234,264 B2
(45) Date of Patent: Jan. 12, 2016

(54) MAGNESIUM ALLOYS FOR HYDROGEN STORAGE

(75) Inventors: Arne Kristian Dahle, The Gap (AU); Kazuhiro Nogita, Augsburg (AU)

(73) Assignee: HYDREXIA PTY LIMITED, The University of Queensland (AU)

( * ) Notice: Subject to any disclaimer, the term of this patent is extended or adjusted under 35 U.S.C. 154(b) by 923 days.

(21) Appl. No.: 11/720,493

(22) PCT Filed: Dec. 2, 2005

(86) PCT No.: PCT/AU2005/001825
§ 371 (c)(1),
(2), (4) Date: May 30, 2007

(87) PCT Pub. No.: WO2006/060851
PCT Pub. Date: Jun. 15, 2006

(65) Prior Publication Data
US 2009/0123325 A1    May 14, 2009

(30) Foreign Application Priority Data

Dec. 7, 2004    (AU) ................................ 2004907006

(51) Int. Cl.
C22C 23/00    (2006.01)
C01B 3/00     (2006.01)
C22C 30/00    (2006.01)

(52) U.S. Cl.
CPC ............... *C22C 23/00* (2013.01); *C01B 3/0031* (2013.01); *C01B 3/0042* (2013.01); *C22C 30/00* (2013.01); *Y02E 60/327* (2013.01)

(58) Field of Classification Search
CPC ...... C22C 23/00; C22C 30/00; C01B 3/0031; C01B 3/0042; Y02E 60/327
USPC .......... 420/402, 405, 406, 414; 148/420, 666; 429/218.2
See application file for complete search history.

(56) References Cited

U.S. PATENT DOCUMENTS

| | | | |
|---|---|---|---|
| 4,016,836 A | 4/1977 | Kay et al. | |
| 4,200,624 A | 4/1980 | Muller et al. | |
| 4,402,187 A | 9/1983 | Golbert et al. | |
| 4,446,111 A | 5/1984 | Halene et al. | |
| 4,446,121 A | 5/1984 | Gamo | |
| 4,946,646 A | 8/1990 | Gamo et al. | |
| 4,964,524 A | 10/1990 | Halene | |
| 5,006,328 A | 4/1991 | Hong | |
| 5,501,917 A | 3/1996 | Hong | |
| 5,506,069 A * | 4/1996 | Ovshinsky et al. | 429/59 |
| 5,695,530 A | 12/1997 | Hong et al. | |
| 5,733,680 A | 3/1998 | Hong | |
| 5,766,799 A | 6/1998 | Hong | |
| 5,906,792 A | 5/1999 | Schulz | |
| 6,099,811 A | 8/2000 | Stetson et al. | |
| 6,153,032 A | 11/2000 | Iba | |
| 6,207,104 B1 | 3/2001 | Kadir et al. | |
| 6,258,184 B1 | 7/2001 | Iba et al. | |
| 6,274,194 B1 | 8/2001 | Mori et al. | |
| 6,328,821 B1 | 12/2001 | Ovshinsky et al. | |
| 6,338,764 B1 | 1/2002 | Mori et al. | |
| 6,387,152 B1 | 5/2002 | Klassen et al. | |
| 6,418,275 B1 | 7/2002 | Yang | |
| 6,471,935 B2 | 10/2002 | Jensen et al. | |
| 6,478,844 B1 | 11/2002 | Ovshinsky | |
| 6,491,866 B1 | 12/2002 | Ovshinsky et al. | |
| 6,508,866 B1 | 1/2003 | Golben | |
| 6,602,639 B1 | 8/2003 | Nakamura | |
| 6,689,193 B1 | 2/2004 | Hosoe et al. | |
| 6,702,878 B2 | 3/2004 | Ito et al. | |
| 6,709,497 B2 | 3/2004 | Myasnikov et al. | |
| 6,726,783 B1 | 4/2004 | Young et al. | |
| 6,746,645 B2 | 6/2004 | Ovshinsky et al. | |
| 7,056,397 B2 | 6/2006 | Noreus et al. | |
| 7,060,120 B1 | 6/2006 | Kanoya et al. | |
| 7,094,387 B2 | 8/2006 | Zidan | |
| 7,115,247 B2 | 10/2006 | Zhao et al. | |
| 7,128,997 B2 | 10/2006 | Harding et al. | |
| 7,175,721 B2 | 2/2007 | Takata et al. | |
| 7,175,826 B2 | 2/2007 | Lemmon et al. | |
| 2002/0100369 A1 | 8/2002 | Kuriiwa et al. | |
| 2002/0197181 A1 | 12/2002 | Osawa et al. | |

(Continued)

FOREIGN PATENT DOCUMENTS

| CA | 1177624 | 11/1984 |
|---|---|---|
| CA | 2219522 C | 11/1996 |

(Continued)

OTHER PUBLICATIONS

Gschneidner et al., Properties of Pure Metals-Mischmetal (MM), ASM Handbook, 1990, ASM International, vol. 2, p. 1*
Aoki et al., English machine translation of JP 2003-147471 from the IDS, May 2003, p. 1-9.*
Kim and Hong, Materials Transactions, 43, 1741-1747, 2002.
Orimo and Fuji, Applied Physics A, 72, 167-186, 2001.
Japanese Office Action, Patent Application, 2007-543658, mailed Feb. 28, 2012.
Co-Pending U.S. Appl. No. 13/577,358, filed Aug. 6, 2012; Published as WO 2011/103627 A1 on Sep. 1, 2011.
Co-Pending U.S. Appl. No. 13/577,793, filed Aug. 8, 2012; Published as WO 2011/103626 A1 on Sep. 1, 2011.

*Primary Examiner* — Roy King
*Assistant Examiner* — Caitlin Kiechle
(74) *Attorney, Agent, or Firm* — The Dobrusin Law Firm, P.C.

(57) ABSTRACT

A method of producing a hydrogen storage material including the steps of: forming a magnesium-nickel melt having up to 50 wt % nickel; adding up to 2 wt % of a refining element to the melt under a non-oxidizing atmosphere, the refining element having an atomic radius within the range of 1-1.65 times the atomic radius of magnesium, such as at least one element selected from the group consisting of Zr, Na, K, Ba, Ca, Sr, La, Y, Yb, Rb and Cs; and solidifying the melt to produce the hydrogen storage material.

28 Claims, 16 Drawing Sheets

(56) References Cited

U.S. PATENT DOCUMENTS

Figure 1:
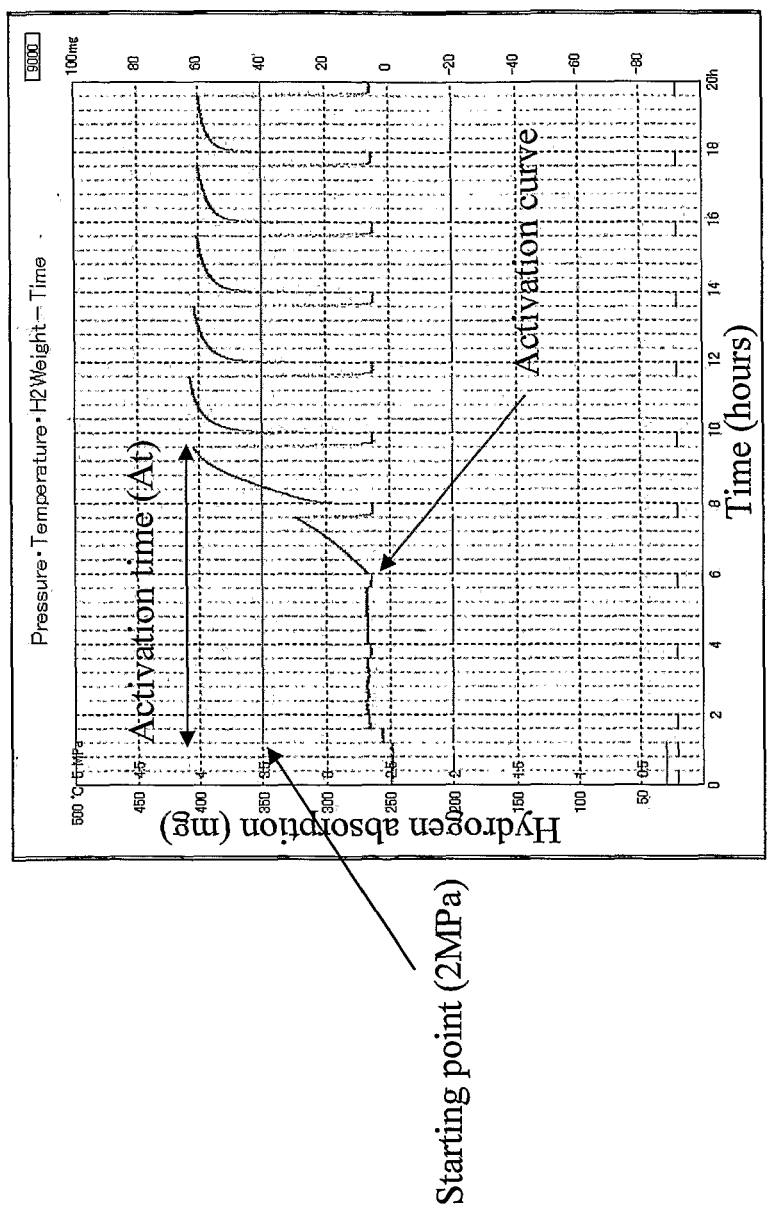

| | | |
|---|---|---|
| 2004/0031591 A1 | 2/2004 | Myasnikov et al. |
| 2004/0110023 A1 | 6/2004 | Towata et al. |
| 2006/0027041 A1 | 2/2006 | Arashima et al. |
| 2006/0027272 A1 | 2/2006 | Tomlinson et al. |
| 2006/0032561 A1 | 2/2006 | Young et al. |
| 2006/0051233 A1 | 3/2006 | Ugai et al. |
| 2006/0051656 A1 | 3/2006 | Ouwerkerk et al. |
| 2006/0068286 A1 | 3/2006 | Mukai |
| 2006/0073066 A1 | 4/2006 | Osawa et al. |
| 2006/0099127 A1 | 5/2006 | Zaluska et al. |
| 2006/0108457 A1 | 5/2006 | Pratt et al. |
| 2006/0159613 A1 | 7/2006 | McGrady |
| 2006/0166099 A1 | 7/2006 | Okabe et al. |
| 2006/0199076 A1 | 9/2006 | Yasuoka et al. |
| 2006/0257314 A1 | 11/2006 | Natarajan |
| 2006/0266441 A1 | 11/2006 | Fetcenko et al. |
| 2007/0006950 A1 | 1/2007 | Okada et al. |
| 2009/0123325 A1 | 5/2009 | Dahle |

FOREIGN PATENT DOCUMENTS

| | | |
|---|---|---|
| CN | 1243841 C | 6/2004 |
| CN | 1266296 C | 6/2004 |
| CN | 1272460 C | 9/2004 |
| CN | 1272461 C | 12/2004 |
| CN | 1256456 C | 1/2005 |
| CN | 1268779 C | 1/2005 |
| CN | 1754972 | 4/2006 |
| CN | 1769506 A | 5/2006 |
| CN | 1786239 A | 6/2006 |
| EP | 293660 | 12/1988 |
| EP | 503686 | 9/1992 |
| EP | 799324 | 8/1997 |
| EP | 862660 | 9/1998 |
| EP | 0986119 | 3/2000 |
| EP | 996183 | 4/2000 |
| EP | 1020285 | 7/2000 |
| EP | 1026764 | 8/2000 |
| EP | 1082469 | 3/2001 |
| EP | 1243041 | 9/2002 |
| EP | 1386974 | 2/2004 |
| EP | 1511099 | 2/2005 |
| EP | 1683758 | 7/2006 |
| EP | 1721996 | 11/2006 |
| EP | 1749599 | 2/2007 |
| EP | 1753886 | 2/2007 |
| EP | 1757557 | 2/2007 |
| GB | 2148477 A | 5/1985 |
| JP | 60-262830 | 12/1985 |
| JP | 08-69796 | 3/1996 |
| JP | 2002/180174 A | 6/2002 |
| JP | 2003/147471 A | 5/2003 |
| JP | 2003/147472 A | 5/2003 |
| JP | 2003193166 | 7/2003 |
| KR | 6084238 A | 7/2006 |
| TW | 00253438 B | 4/2006 |
| WO | 95/34918 | 12/1995 |
| WO | 96/19594 | 6/1996 |
| WO | 96/36083 | 11/1996 |
| WO | 97/19202 | 5/1997 |
| WO | 99/55926 | 11/1999 |
| WO | 01/38591 | 5/2001 |
| WO | 01/39289 | 5/2001 |
| WO | 01/92592 | 12/2001 |
| WO | 02/07240 | 1/2002 |
| WO | 02/43170 | 5/2002 |
| WO | 03/006874 | 1/2003 |
| WO | 2005/060547 | 7/2005 |
| WO | 2005/100624 | 10/2005 |
| WO | 2006/033847 | 3/2006 |
| WO | 2006/036554 | 4/2006 |
| WO | 2006/060851 | 6/2006 |
| WO | 2006/063627 | 6/2006 |
| WO | 2006/075501 | 7/2006 |
| WO | 2006/079312 | 8/2006 |
| WO | 2006/085542 | 8/2006 |
| WO | 2006/095339 | 9/2006 |
| WO | 2006/114728 | 11/2006 |
| WO | 2007/003679 | 1/2007 |
| WO | 2007/004712 | 1/2007 |
| WO | 2007/018291 | 2/2007 |
| WO | 2007/018292 | 2/2007 |
| WO | 2007/019749 | 2/2007 |
| WO | 2007/021055 | 2/2007 |
| WO | 2009/109962 A2 | 9/2009 |
| WO | 2011/103625 A1 | 9/2011 |
| WO | 2011/103627 A1 | 9/2011 |

* cited by examiner

MAGNESIUM ALLOYS FOR HYDROGEN STORAGE

FIELD OF THE INVENTION

This invention relates to hydrogen storage materials and particularly relates to a cast alloy which can be used as a hydrogen storage material.

BACKGROUND OF THE INVENTION

As the world's population expands and economic activity increases, there are ever increasing signs that increasing atmospheric concentrations of carbon dioxide are warming the earth causing climate change. While the eventual depletion of the world's oil and fossil fuel energy sources will inevitably require other economic energy sources to be found, the more noticeable signs of global warming have increased pressures for global energy systems to move away from carbon rich fuels whose combustion produces carbon monoxide and carbon dioxide gases.

Hydrogen energy is attracting a great deal of interest and is expected to eventually be a replacement for petroleum based fuels. However, there are still several technical issues and barriers that must be overcome before hydrogen can be adopted as a practical fuel, the main obstacle being the development of a viable hydrogen storage system. While hydrogen can be stored as a compressed gas or a liquid, the former occupies a large volume and the latter is energy intensive to produce, reducing any environmental benefits. In addition, both gaseous and liquid hydrogen are potentially dangerous should the pressure storage vessels be ruptured.

A safer, more compact method of hydrogen storage is to store it within solid materials. When infiltrated with hydrogen at relatively low pressures, metals and inter-metallic compounds can absorb large quantities of hydrogen in a safe, solid form. The stored hydrogen can be released when required by simply heating the alloy. Storage of hydrogen as a solid hydride can provide a greater weight percentage storage than compressed gas. However a desirable hydrogen storage material must have a high storage capacity relative to the weight of the material, a suitable desorption temperature, good kinetics, good reversibility and be of a relatively low cost.

Pure magnesium has sufficient theoretical hydrogen carrying capacity at 7.6 wt %. However the resulting hydride is too stable and the temperature must be increased to 278° C. for the hydrogen to be released. This desorption temperature makes such materials economically unattractive. A lower desorption temperature is desirable to not only reduce the amount of energy required to release the hydrogen but to enable the efficient utilisation of exhaust heat from vehicles to release the hydrogen. Compared to pure magnesium, the compound $Mg_2Ni$ has a reduced hydrogen storage capacity of 3.6 wt % but, importantly, the temperature required for hydrogen release is decreased to less than that of pure magnesium. The mechanism of hydrogen storage is believed to involve the formation of (solid) hydride particles, i.e. $MgH_2$ and $Mg_2NiH_4$ in the microstructure.

Recently, thixotropic casting techniques followed by partial remelting and quenching have been used [Y.-J. Kim, T.-W. Hong: Materials Transactions 43 (2002) 1741-1747] to produce hypoeutectic Mg—Ni alloys consisting of magnesium rich dendrides surrounded by refined Mg—$Mg_2Ni$ eutectic. These alloys absorb large amounts of hydrogen, similar to pure magnesium and display only a single hydrogen absorption plateau in the pressure-composition-temperature (PCT) curve, i.e. not separate plateaus for each phase. It is believed that the nickel and/or $Mg_2Ni$ phase acts as a catalyst, improving the kinetics of hydrogen transfer into the magnesium rich solid phases via $MgH_2$ formation.

This realisation has encouraged research [See review by S. Orimo and H. Fuji, Applied Physics A 72 (2001) 167-186] using nano technology and powder metallurgy techniques to produce materials with large internal interfacial areas. These techniques are attractive because they result in large interface areas and they introduce crystallographic defects such as dislocations and twins, which could distribute potential catalysts throughout the microstructure, enabling them to have a widespread influence on the kinetics of the reaction. Unfortunately nano-scale powder metallurgy techniques offer limited control over the crystallographic structure of the phases (ie. interfaces, twins etc), the powder would be highly explosive and would be prohibitively expensive for large-scale mass production of commercial hydrogen storage components. None of the research reported to date considers methods by which higher performance hydrogen storage components can be produced using lower cost processes more applicable to mass production.

It is an object of the present invention to provide a castable MgNi alloy with improved hydrogen storage capabilities.

Reference to any prior art in the specification is not, and should not be taken as, an acknowledgment or any form of suggestion that this prior art forms part of the common general knowledge in Australia or any other jurisdiction.

SUMMARY OF THE INVENTION

According to one aspect, the invention may provide a method of producing a hydrogen storage material including the steps of forming a magnesium-nickel melt having additions of at least one refining element, the refining element being able to promote a refined eutectic structure with increased twinning in the magnesium-nickel intermetallic phase and solidifying the magnesium-nickel melt to a hydrogen storage material with said refined eutectic structure.

In one preferred embodiment, the magnesium-nickel melt is formed by the steps of adding nickel to the magnesium melt to produce a hypoeutectic magnesium-nickel alloy (ie. greater than zero-23.5 wt % Ni), homogenising the magnesium-nickel melt, and adding the refining element or elements to the melt under a protective atmosphere at addition rates of greater than zero and up to 2 wt % and preferably greater than zero and less than 500 ppm.

The refining element has an atomic radius within the range of about 1-1.65 times that of magnesium. It is understood that refining elements with atomic radii within this range will provide the refined eutectic structure discussed above. The refining elements are selected from the group comprising Zr, Na, K, Ba, Ca, Sr, La, Y, Yb, Rb, Cs and rare earth elements such as Eu. Zirconium is added to grain refine the magnesium crystals and when used requires at least one more of the elements from the group.

In another aspect, the invention may provide a method of producing a hydrogen storage material comprising the steps of forming a hypoeutectic magnesium nickel melt having additions of at least one refining element having an atomic radius within the range of 1-1.65 times that of magnesium, the refining element being provided in the melt at addition rates greater than zero and up to 2 wt % and preferably less than 2400 and more preferably less than 500 ppm, and casting the magnesium nickel melt.

The solidifying step in both aspects is a casting step where the metal is cast by a suitable procedure such as pouring into preheated metallic moulds cooling the casting. The solidifying step may be other controlled solidifying processes. However, once the alloy has been cast it is then subject to activation and use as a hydrogen storage material. The alloy is preferably used in the cast condition.

In another embodiment of the invention, there is provided a hydrogen storage alloy comprising or consisting essentially of a hypoeutectic magnesium nickel alloy having greater than zero and up to 2 wt % of a refining element, the refining element having an atomic radius of about 1-1.65 times that of magnesium; and the balance magnesium and incidental impurities.

The refining additions are selected from the group of Zr, Na, K, Ba, Ca, Sr, La, Y, Yb, Rb, Cs and rare earth elements with addition rates greater than zero and up to 2 wt % and preferably greater than zero and less than 2400 or more preferably greater than zero and less than 500 ppm. The more preferred addition elements are sodium and zirconium.

The applicants have found that by the addition of trace elements having atomic radii of about that of magnesium up to 1.65 times the atomic radius of magnesium to hypoeutectic MgNi systems, twin crystal defects are encouraged in the $Mg_2Ni$ intermetallic phase. It is thought that increasing the refinement and crystal defects in the $Mg_2Ni$ phase catalyses the hydriding reaction in the magnesium rich solid phases of the alloy, thus increasing the capacity of the alloy for hydrogen uptake and the kinetics of the hydrogen absorption.

Furthermore as the material is produced by a casting solidification process, it is a more commercially viable process for large scale mass production of hydrogen storage components.

DESCRIPTION OF THE DRAWINGS AND PREFERRED EMBODIMENT

Figure 2:
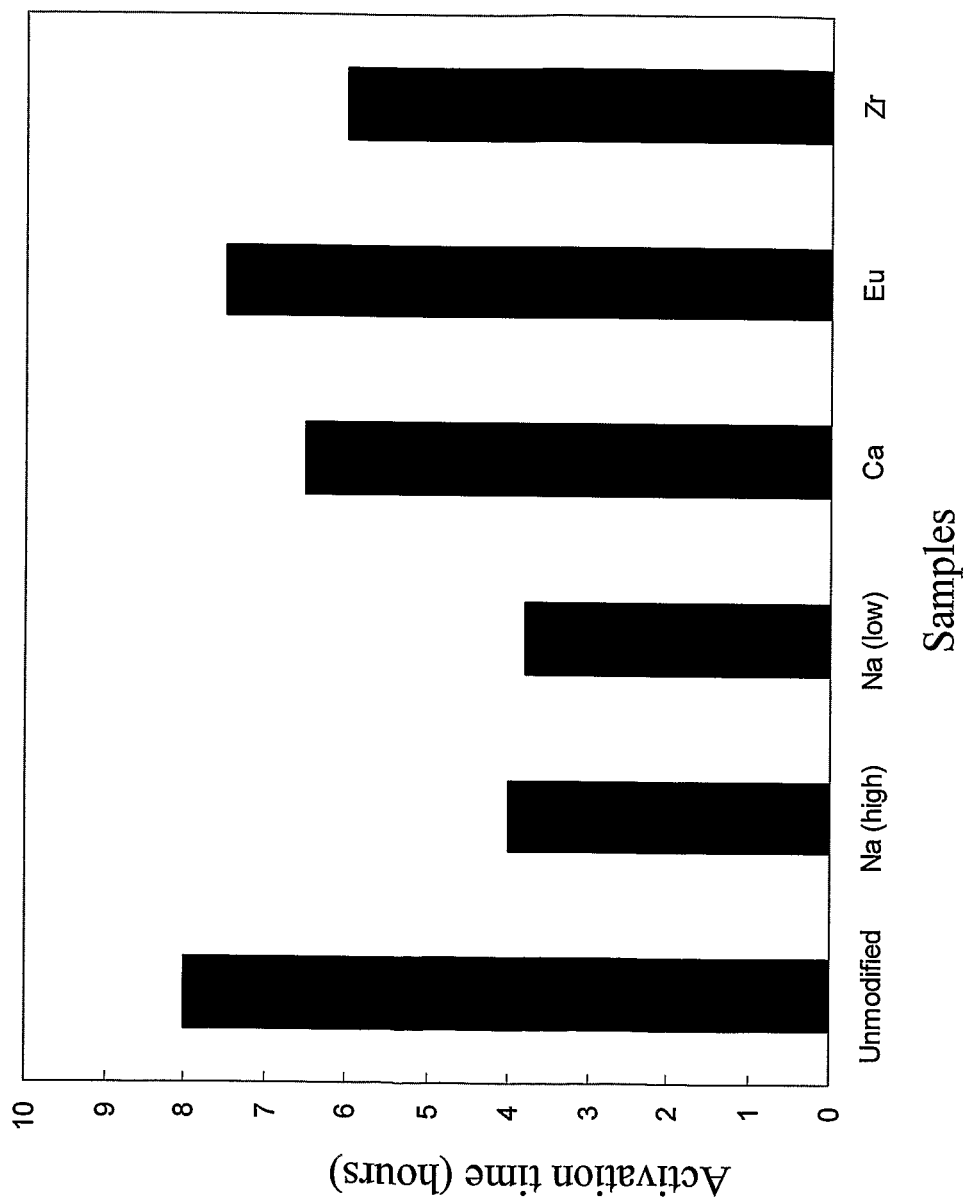
Figure 3:
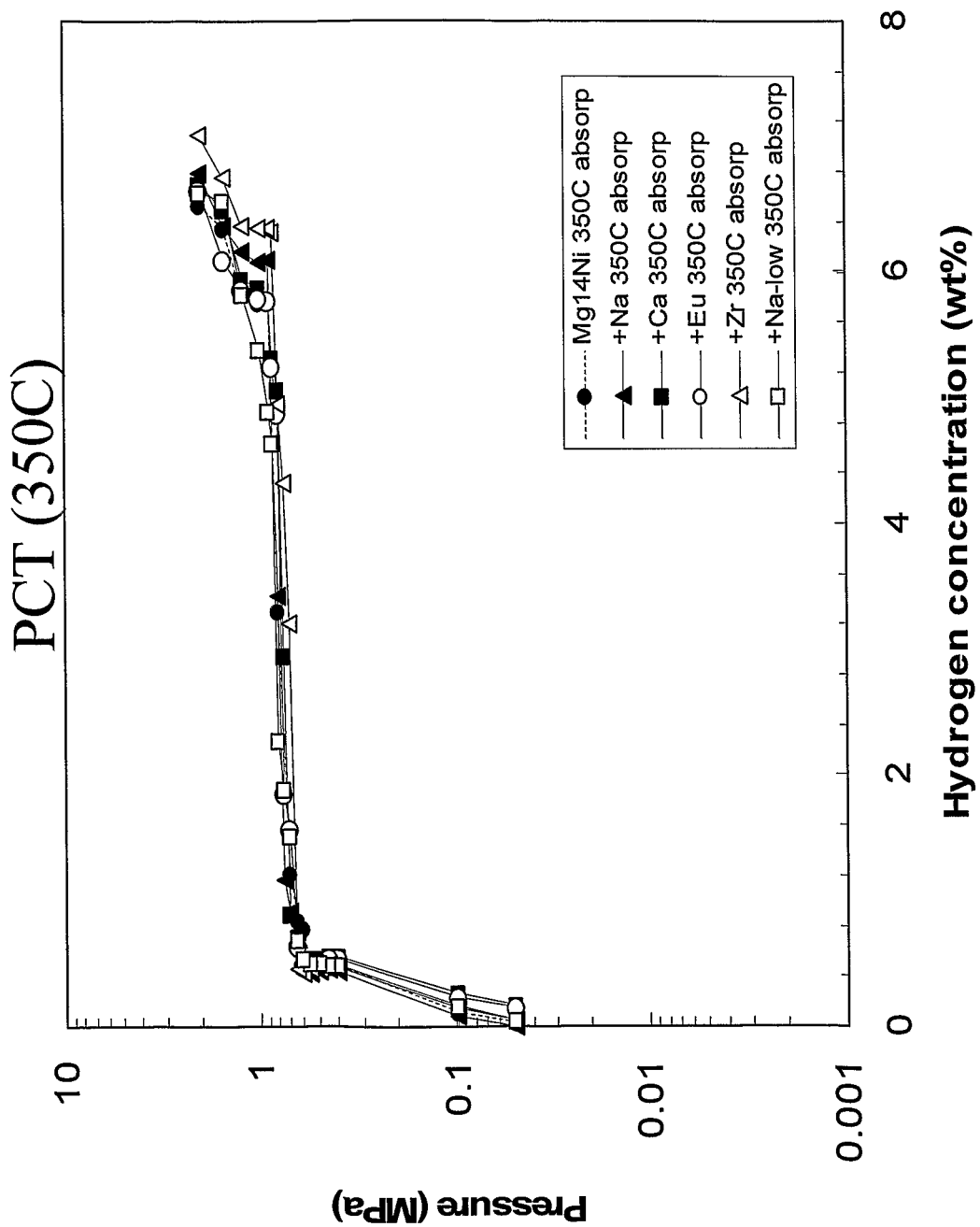
Figure 4:
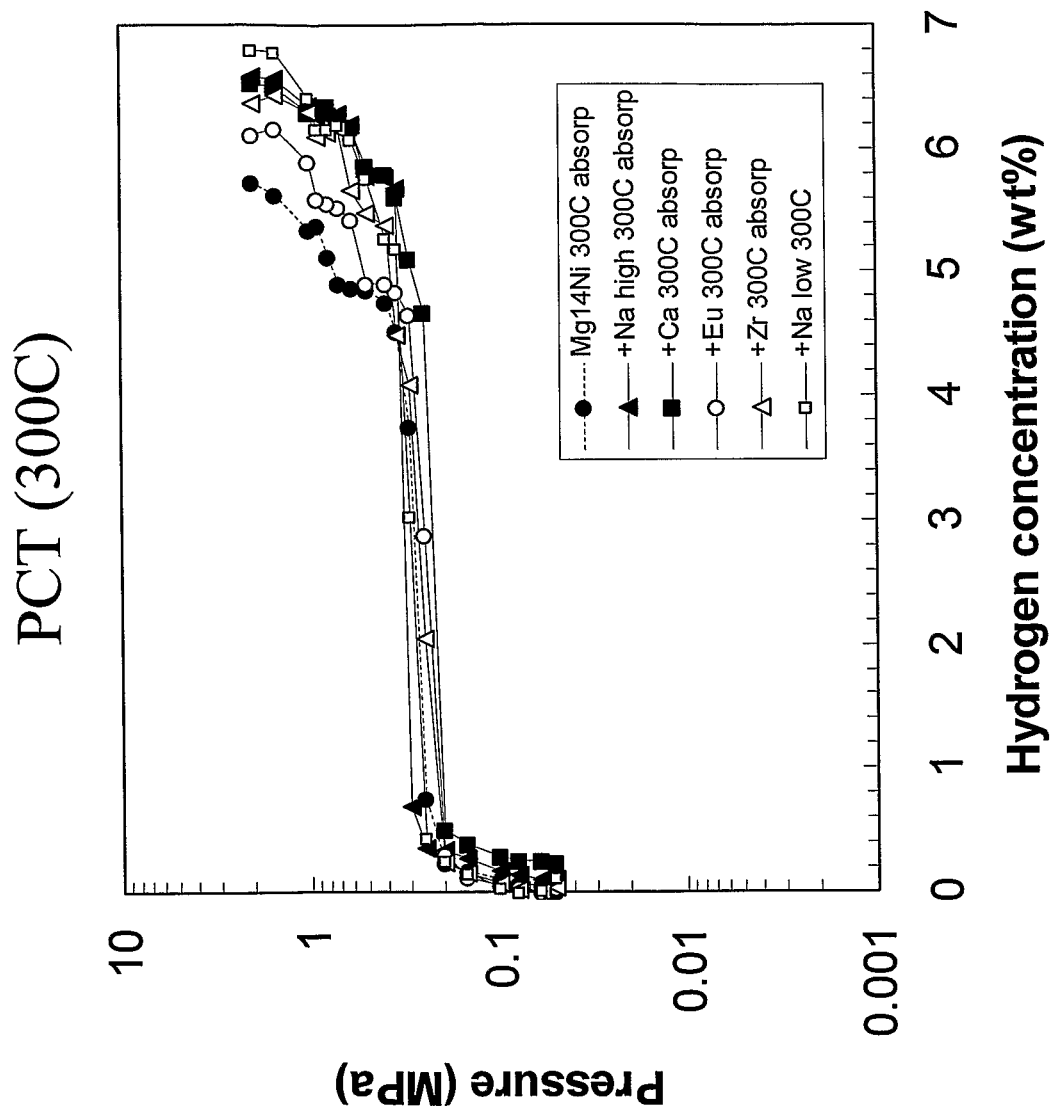
Figure 5:
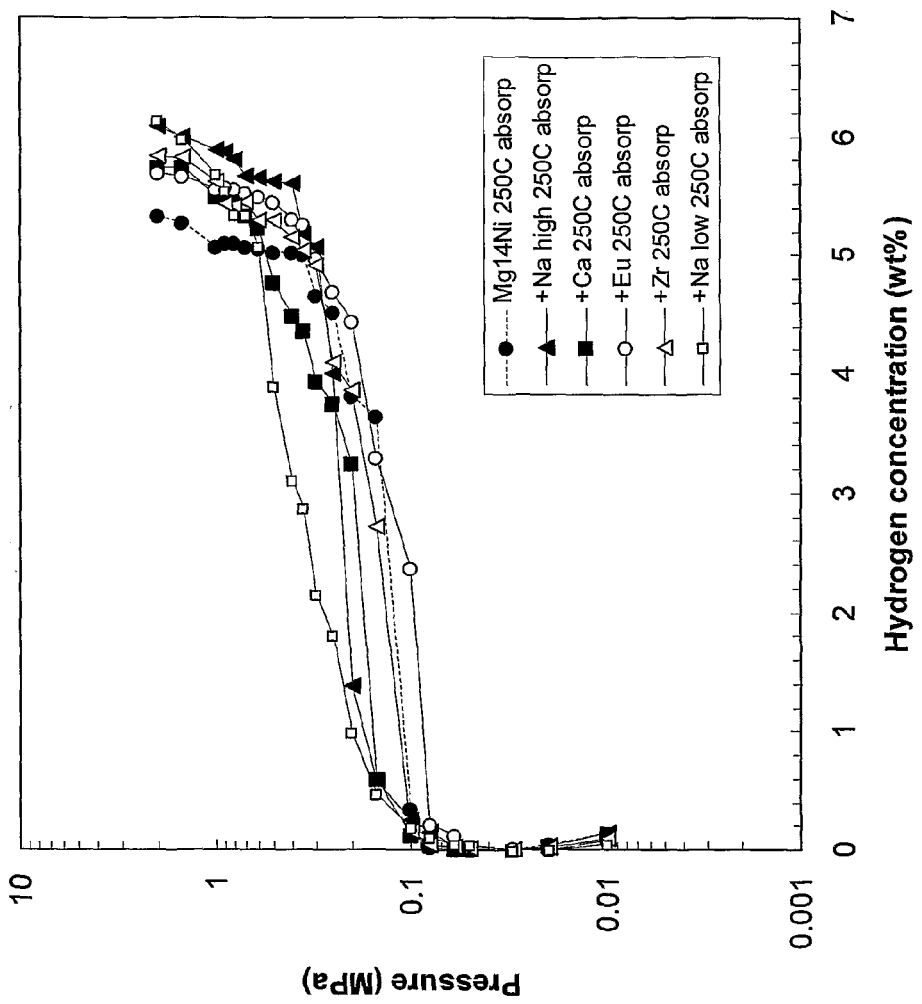
Figure 6:
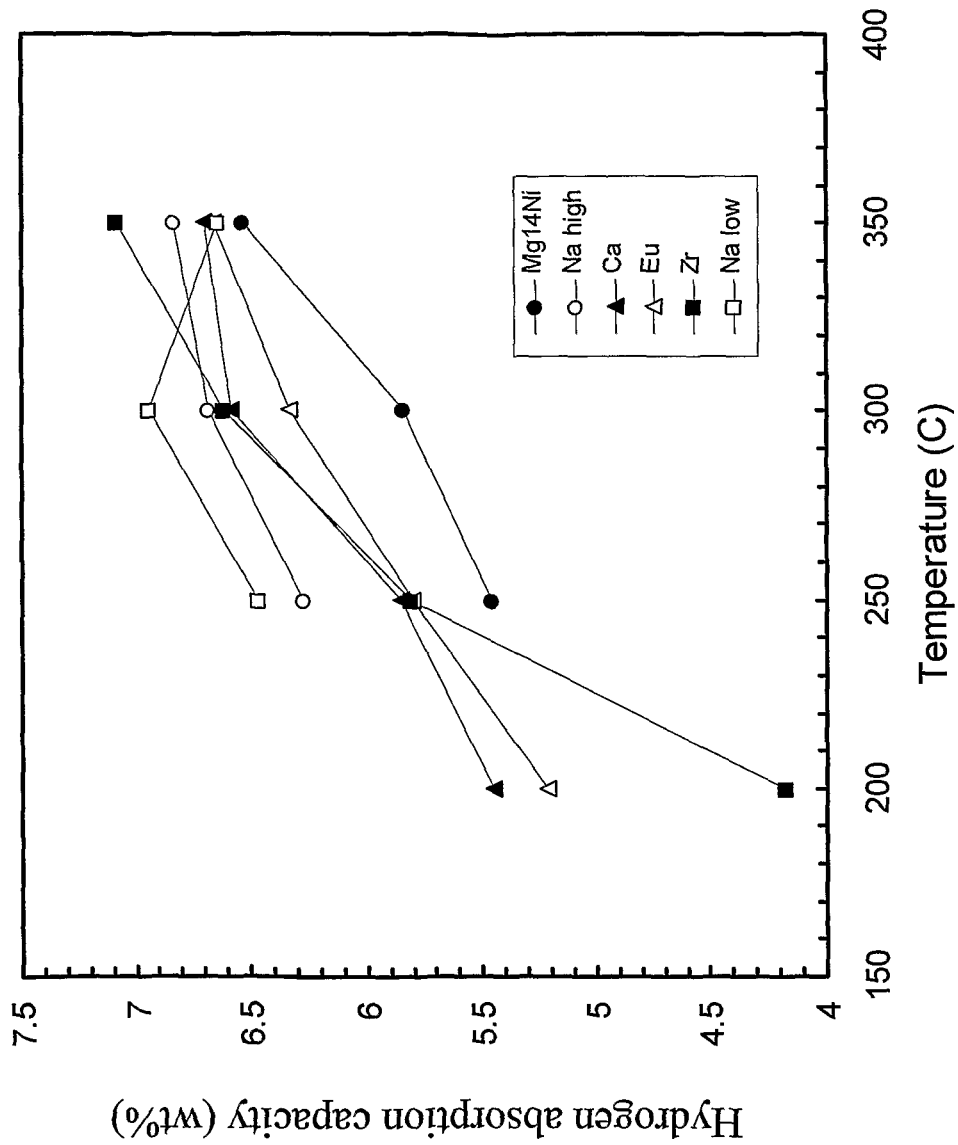
Figure 7:
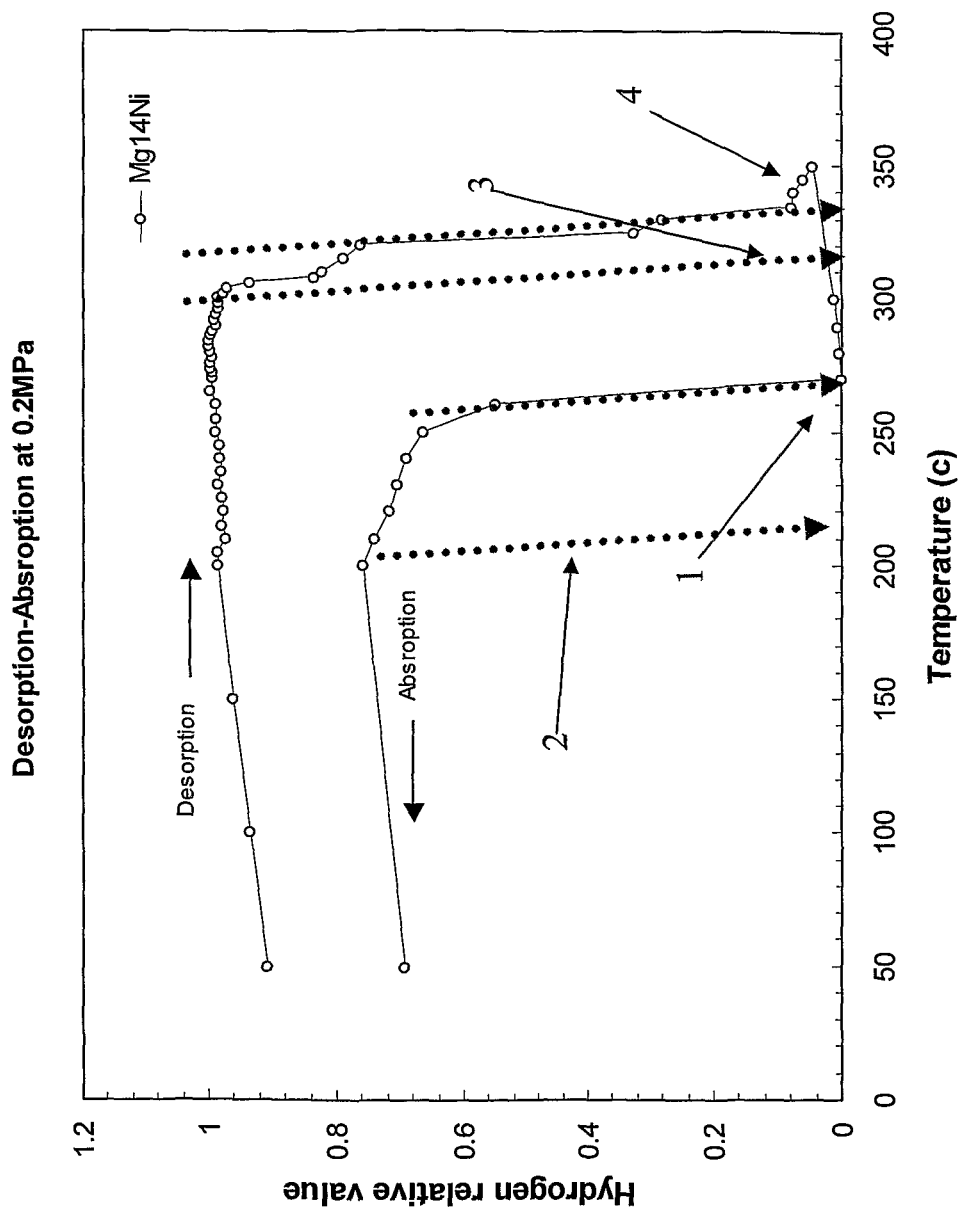
Figure 8:
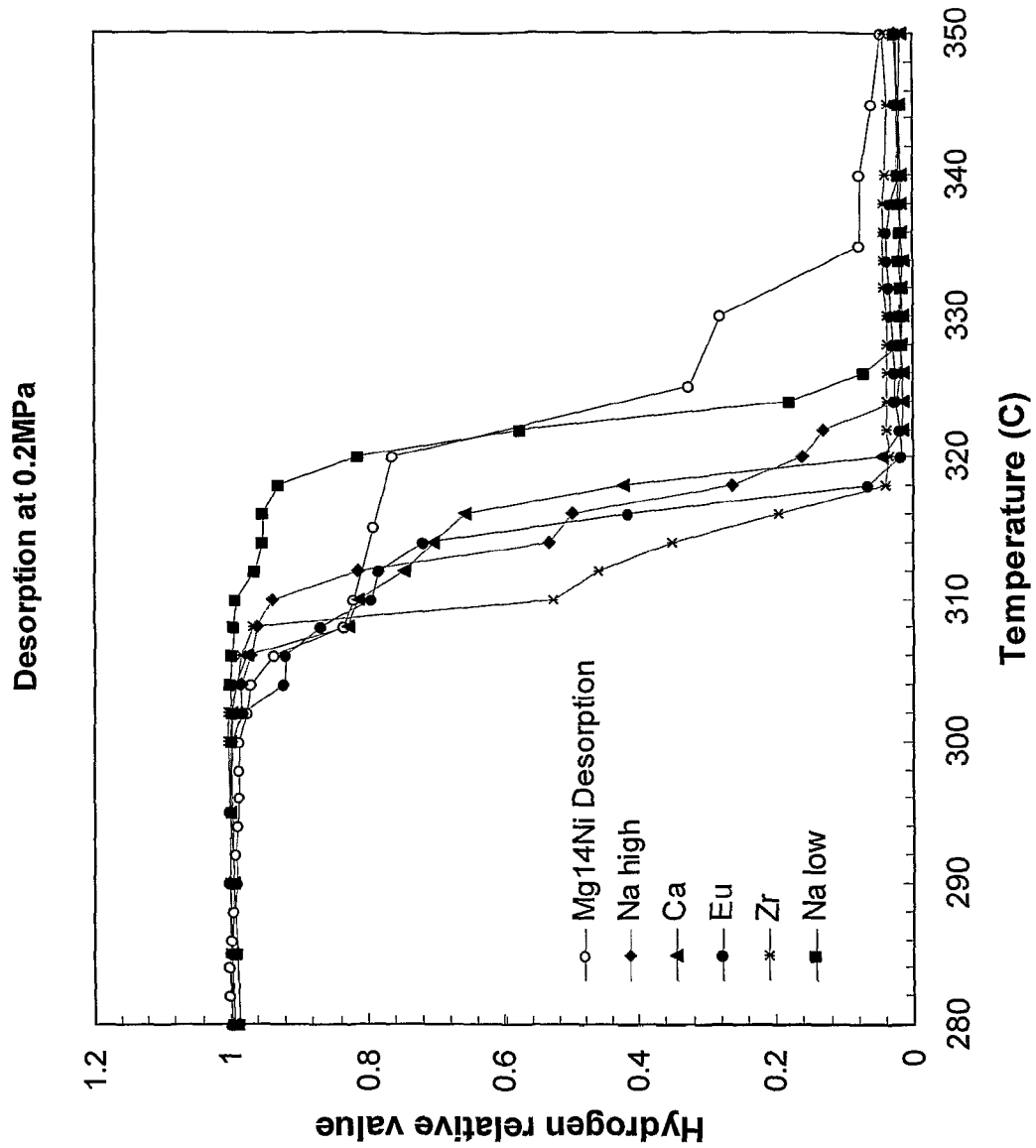

Further features objects and advantages of the present invention will become apparent from the following description of the preferred embodiment and accompanying drawings in which FIG. 1 is a pressure composition temperature graph of an unmodified magnesium alloy with 14% Ni, FIG. 2 is a graph summarising activation time at 350° C. and 2 MPa for Examples 1-6, FIG. 3 is a graph of PCT absorption data at 350° C. and 2 MPa for Examples 1-6, FIG. 4 is a graph of PCT absorption data at 300° C. and 2 MPa for Examples 1-6, FIG. 5 is a graph of PCT absorption data at 250° C. and 2 MPa for Examples 1-6, FIG. 6 is a graph summarising PCT absorption capacity at 350° C. and 2 MPa, FIG. 7 is a graph illustrating the relationship between absorption and desorption for unmodified Mg 14 Ni alloy, FIG. 8 is a graph of the desorption data at 0.2 MPa for Examples 1-6, and FIG. 9(a)-9(h) are SEM micrographs of the as cast alloys of Examples 1-6.

The hydrogen storage material is produced according to the invention by forming a hypoeutectic magnesium-nickel by adding nickel to molten magnesium. The nickel addition may be up to 20 wt % and preferably 10-20 wt % nickel. The melt is then mixed to provide a homogenised mix.

To this magnesium-nickel alloy, trace elements of crystallography modifying material are added. The elements added are those that refine the magnesium phase and promote a refined eutectic structure with increased twinning in the magnesium-nickel intermetallic phase.

The range of elements satisfying the above two criteria have atomic radii around that of magnesium and up to 1.65 times that of magnesium and include Zr, K, Na, Ba, Ca, Sr, La, Y, Yb, Rb, Cs and rare earth metal elements. The preferred elements used are sodium and/or zirconium.

The melt is again stirred to homogenise the mix and held under a protective atmosphere during the homogenising step. The protective atmosphere is any atmosphere which prevents the magnesium from combusting. Typical atmospheres include $SF_6$ and HFC-134a.

The metal is then cast by a suitable casting procedure such as by pouring into preheated metallic moulds.

While not wishing to be restricted to a particular theory of operation, it is considered that the increase crystal defects, interfacial areas and density of dislocations catalyses the hydriding reaction in the magnesium rich solid phases of the alloy, thus increasing the capacity and kinetics of the alloy for hydrogen uptake.

EXAMPLES

The hydrogen absorption of metal hydride alloys is characterised using equilibrium pressure composition temperature (PCT) data. This data is obtained by keeping an alloy sample at constant temperature while precisely measuring the quantity of hydrogen sorbed and the pressure at which sorption occurs. The quantity of hydrogen sorbed is expressed in terms of alloy composition, either as an atomic ratio of hydrogen atoms to the number of atoms in the base metal alloy or as the capacity of hydrogen in the material on a weight percent basis.

PCT stands for "pressure-composition-isotherm" and shows the maximum hydrogen absorption capacity possible at a fixed temperature. The pressure At absorption is higher than that at desorption and the region of the "plateau" indicates the range suitable for practical storage/release applications.

Most of the hydrogen is absorbed in a range where there is little pressure change. This region of near constant pressure is known as the plateau pressure. Metal hydride formation is also accompanied by hysteresis, which appears as the difference between the upper absorption curve and the lower desorption curve.

Example 1

An unmodified magnesium alloy containing 14 wt % Ni was subjected to a 2 MPa hydrogen atmosphere at 350° C. for a period of 20 hours. The pressure composition temperature data was recorded and shown in FIG. 1.

From FIG. 1, the activation time (At) of the alloy can be determined. The "Activation time" indicates how quickly an alloy becomes "ready" for use as a hydrogen absorption alloy. Shorter activation times save energy and are indicative of fundamental material differences in the kinetic performance of the alloys. Note that activation is generally required only once in the life-cycle of a hydrogen storage alloy. Once the alloy has been activated, the hydrogen absorption time is significantly reduced as evidenced by the last cycles of the run.

Examples 2-6

The magnesium nickel alloy of Example 1 was modified by the addition of a refining element.

Table 1 shows the refining element and the addition rate of that element.

TABLE 1

| Example | Refining element | Addition rate |
| --- | --- | --- |
| 2 | Na | 2400 ppm |
| 3 | Na | 600 ppm |
| 4 | Ca | 800 ppm |
| 5 | Eu | 600 ppm |
| 6 | Zr | 2 wt % |

The activation time from these examples is summarised in FIG. 2. From these results, it can be seen that activation time can be reduced to about 40% of that of the unmodified alloy (from 8 hours to 3.8 hours). Hence for alloys at least up to the addition rates the activation time can be significantly reduced. This is of practical significance but more importantly it is indicative of the superior kinetic performance of the modified alloy.

When the data collected in the above examples was analysed by reference to the absorption curve only, the graph shown in FIG. 3 was produced.

PCT curves (absorption only) at 350° C. show all six samples can absorb around 7 wt % hydrogen. There is little difference between the samples. 100% pure Mg absorbs 7.6 wt % of hydrogen and 7 wt % of hydrogen absorption is close to the theoretical limits for a Mg-14 wt % Ni sample. The Mg primary phases are regarded as the hydrogen absorbing phases and eutectic regions are considered to have a catalytic function improving hydrogen kinetics.

The alloys of Examples 1-6, were then characterised at 300° C. and 250° C. with the absorption results shown in FIGS. 4 and 5 respectively.

At lower temperatures, there is a decreased capacity for absorption but a large difference in performance between alloys. The PCT curve (absorption only) at 300° C. clearly shows the improvement of hydrogen absorption from 5.7 wt % (unmodified) to 6.6 wt % (Na high, Ca and Zr addition) or 6.8 wt % (Na low).

FIG. 6 is a summary of the maximum hydrogen absorption capacity taken from the results shown in FIG. 5. It can be seen that at 350° C. the maximum hydrogen storage capacity is similar (around 7 wt %) for all samples cast.

At 250° C. the modified alloys are superior and the maximum hydrogen capacity can be increased more than 1 wt % relative to the unmodified alloy (from 5.3 wt % to 6.5 wt %).

Even at 200° C. (up to 2 MPa condition), the samples are shown to absorb approximately 5.5 wt % of hydrogen.

In regard to the desorption temperature, usually, at a fixed pressure, absorption temperature is lower than desorption temperature. The exact temperatures will vary depending on the pressure. FIG. 7 shows the relationship between adsorption and desorption for the unmodified Mg 14Ni alloy at 0.2 MPa. The adsorption start temperature 1 is usually higher than the adsorption end temperature 2. When the alloy then goes through the desorption cycle, the desorption start temperature 3 can be seen to be higher than the desorption end temperature 4.

In the representation of the modified alloys of Examples 2-6 relative to the unmodified alloys, it can be seen that the desorption end temperature (plateau region of FIG. 8) at 0.2 MPa decreases approximately 20° C. with modification. In fact, the desorption temperature for the Mg Ni alloy can be reduced by trace element additions.

The addition of the modifying elements increases the amount of internal interfacial areas within the material, the amount of stacking faults and the density of dislocations/twins in the solidified magnesium-nickel alloy. It is believed that the refining element should have an atomic radii in the range mentioned above in order to achieve the metallurgical effects in the as cast metal.

Figure 9A:
Figure 9B:
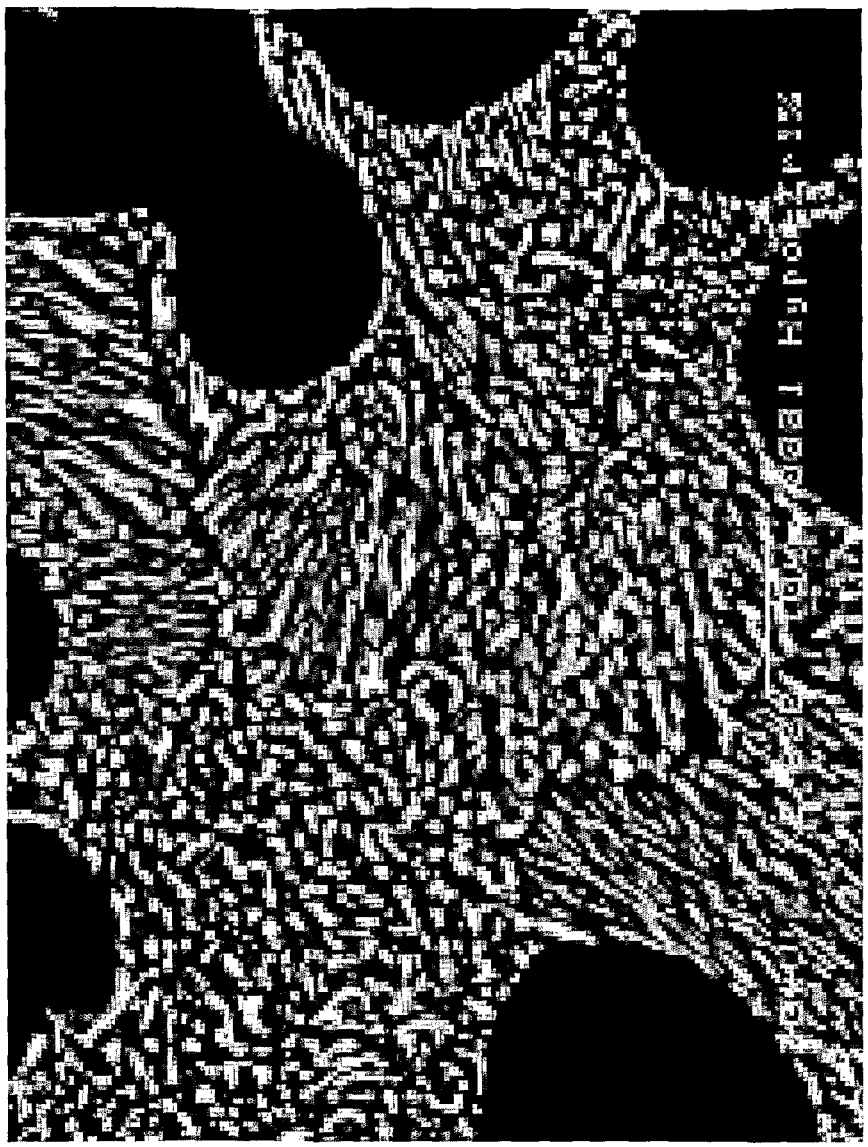
Figure 9C:
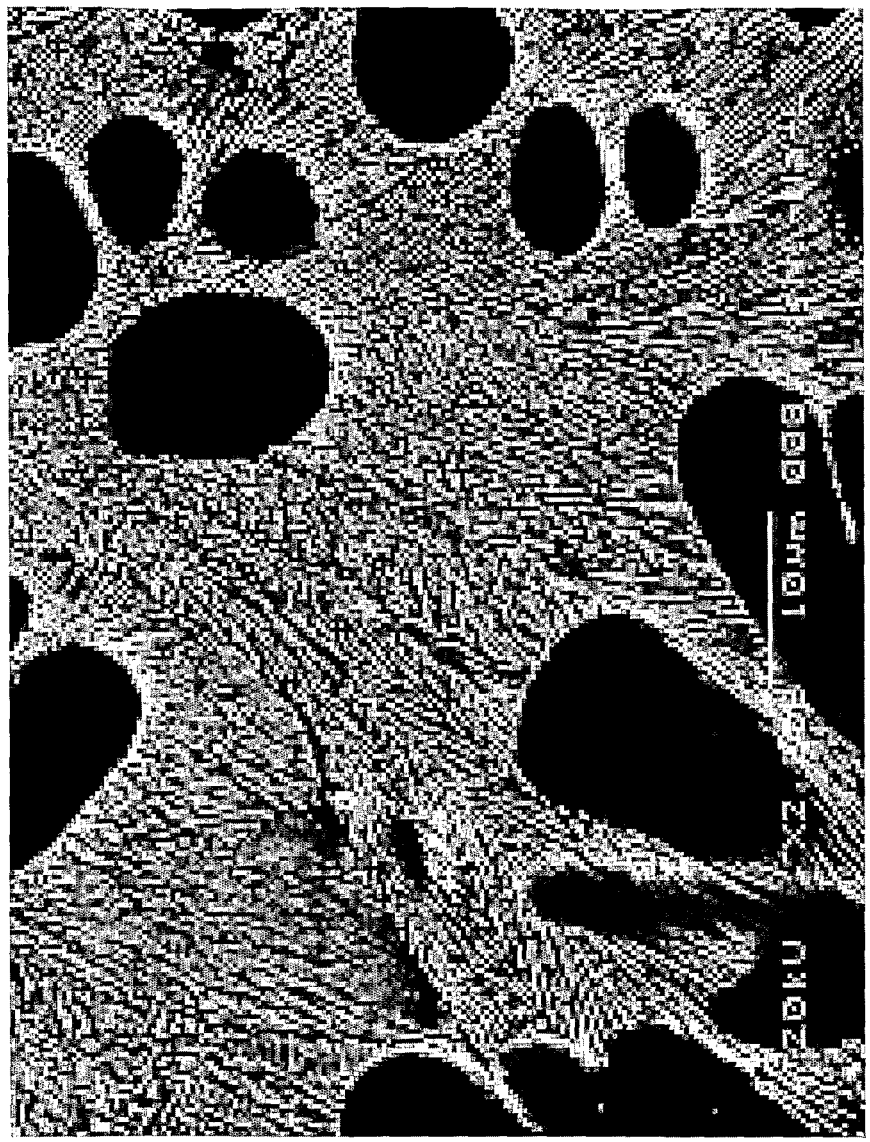
Figure 9D:
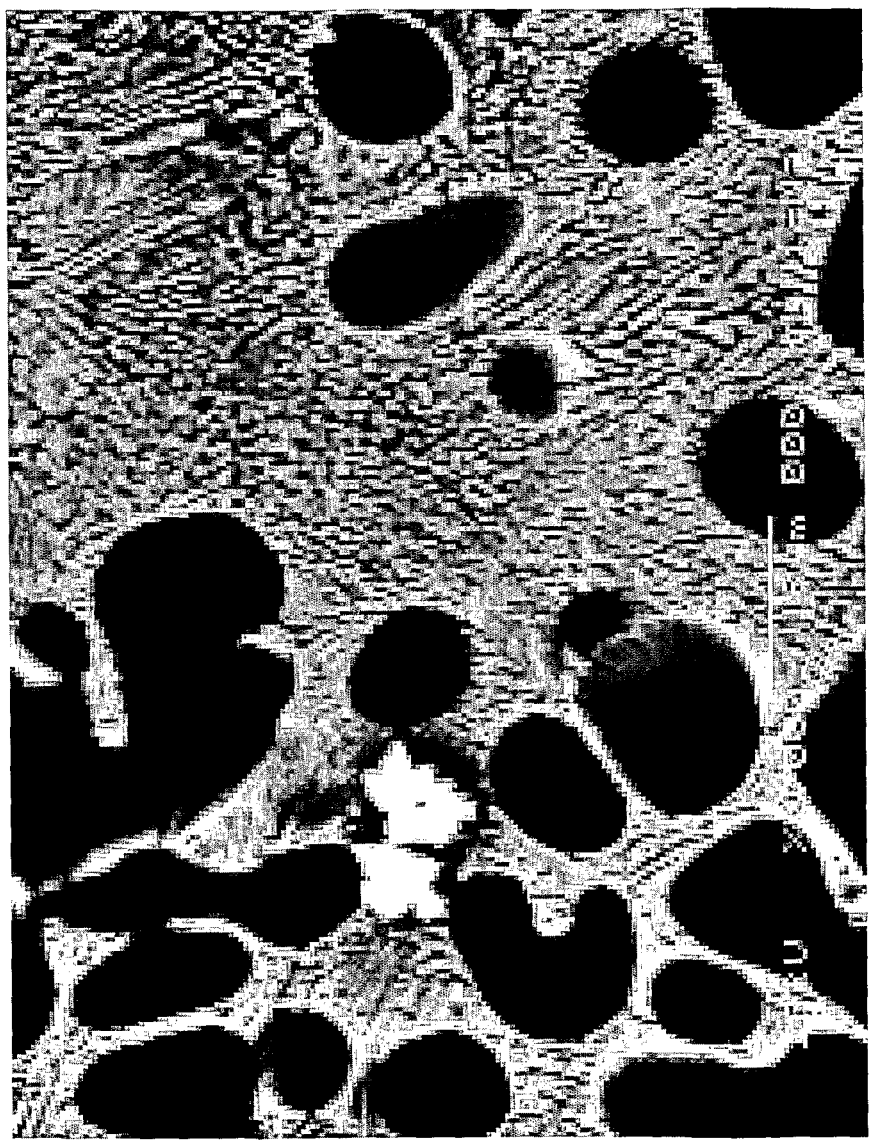
Figure 9E:
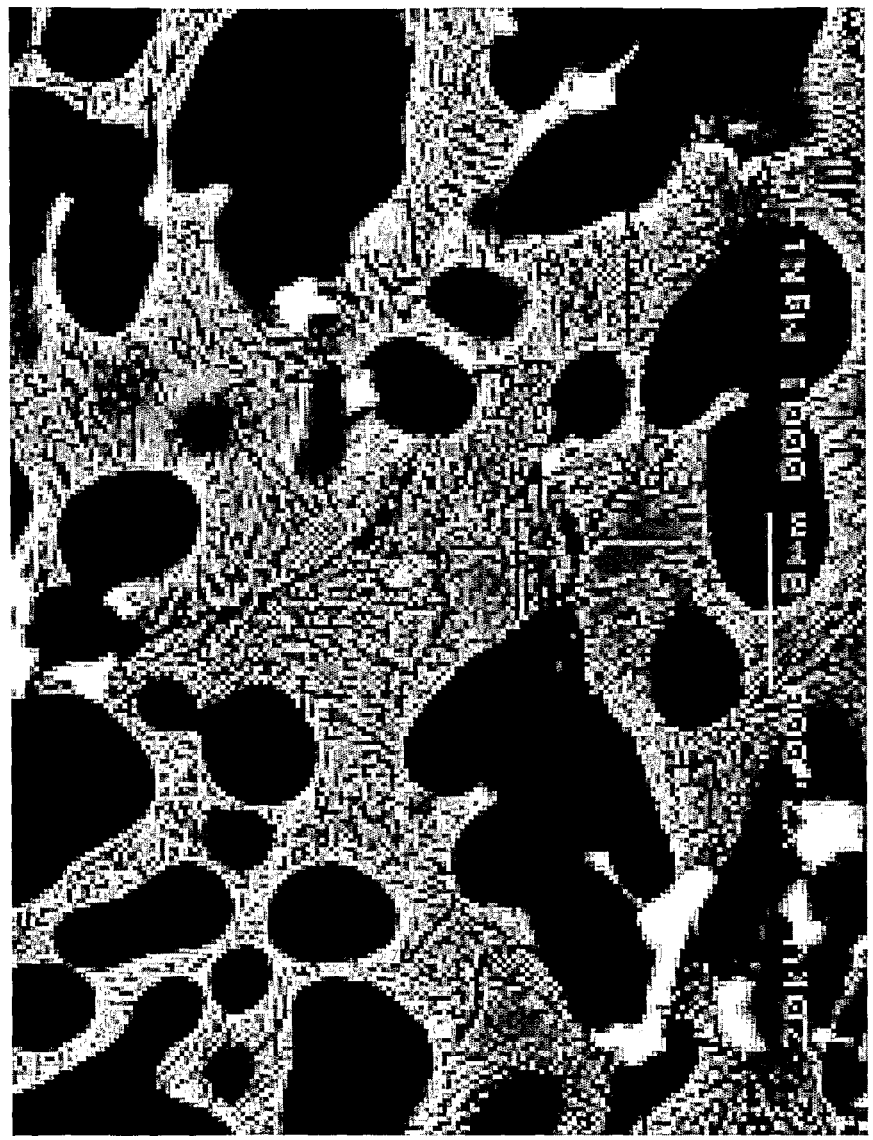
Figure 9F:
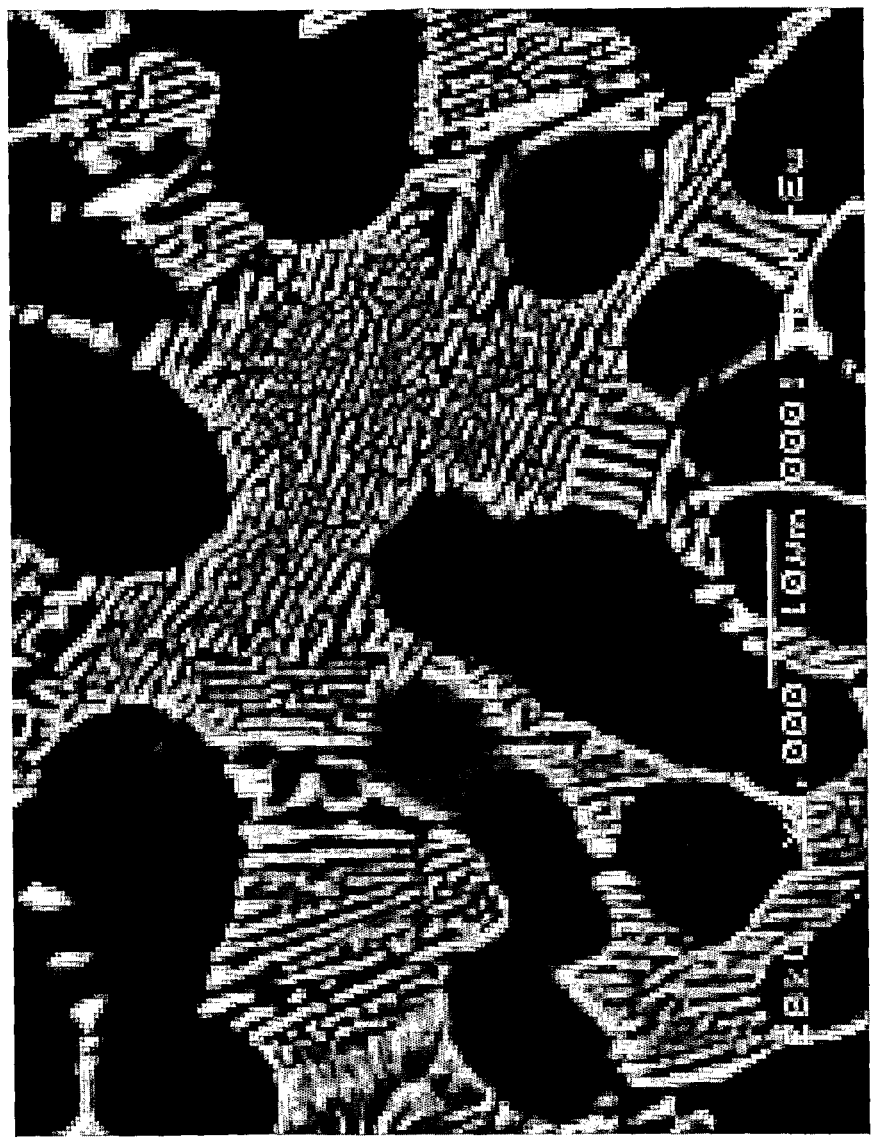
Figure 9G:
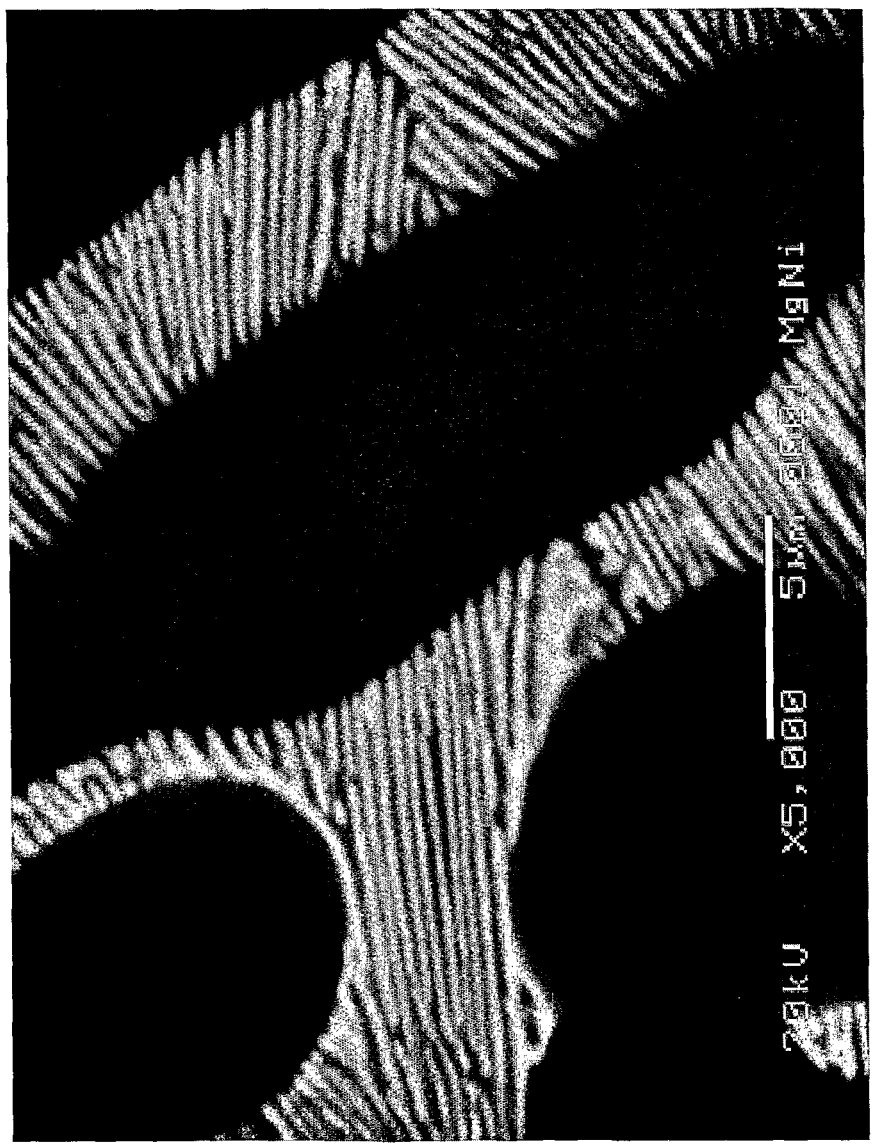
Figure 9H:
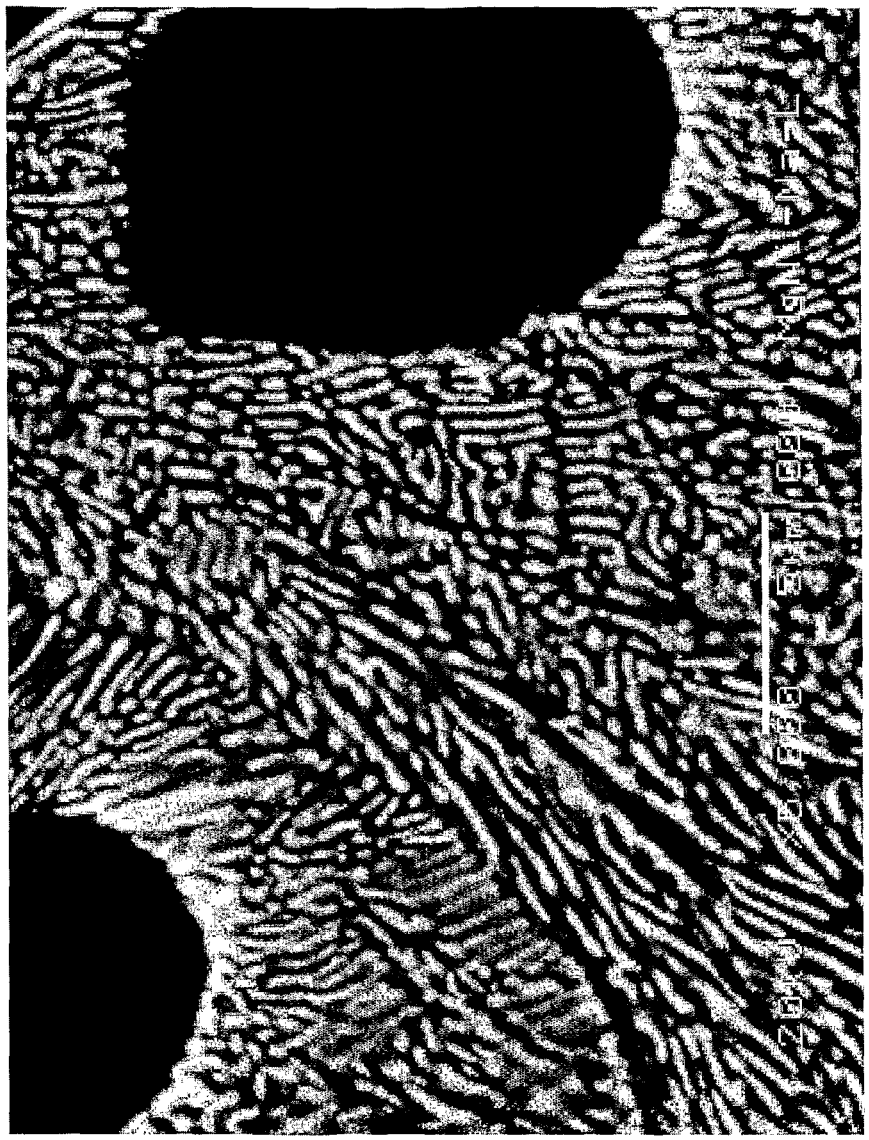

The increase in dislocations caused by the additions is illustrated in the SEM micrographs FIGS. 9(a)-9(h). FIG. 9(a) is the SEM for Mg 14 Ni unmodified; FIG. 9(b) is the SEM for the same alloy with Zr addition; FIG. 9(c) is the SEM for low sodium addition; FIG. 9(d) is the SEM for high sodium addition; FIG. 9(e) is the SEM for calcium addition; and FIG. 9(f) is the SEM for Eu addition. FIG. 9(g) is the Mg 14 Ni unmodified alloy of higher magnification; FIG. 9(h) is the low sodium addition at the higher magnification of FIG. 9(g).

FIG. 9 shows SEM secondary electron images of hypoeutectic Mg-14 wt % Ni alloys of (a) and (g) unmodified, (b) 2 wt % Zr addition, (c) and (h) 600 ppm Na addition, (d) 2400 ppm Na addition, (e) 800 ppm Ca addition and (f) 600 ppm Eu addition alloys. The black in the figures are primary Mg dendrites and small black and white contrast is the Mg—Mg2Ni eutectic structure. The images clearly demonstrate a very refined fibrous eutectic microstructure in all modified samples compared with a coarse eutectic microstructure in the unmodified sample.

All modified samples show a relative improvement of approximately 1 wt % for the maximum hydrogen absorption capacity. The refinement of the structure, even at trace levels of addition is considered quite remarkable yielding eutectic spacings below 1 μm and often below 500 nm. Thus, a nanoscale material is obtained through the combination of an alloy modification and a casting method.

The invention claimed is:

1. A method of producing a hydrogen storage material including the steps of:
   forming a hypoeutectic magnesium-nickel melt, wherein the magnesium-nickel melt contains nickel from greater than zero up to 20 wt %;
   adding up to 2 wt % of a refining element to the hypoeutectic magnesium-nickel melt under a non-oxidising atmosphere, the refining element having an atomic radius within the range of 1-1.65 times the atomic radius of magnesium;
   the refining element being at least one element selected from the group consisting of Zr, Na, K, Ba, Sr, Rb, and Cs wherein Zr is used only in combination with at least one other element in said group; and
   casting the melt to produce the hydrogen storage material.

2. The method of claim 1 wherein the magnesium-nickel melt contains nickel within the range of 10-20 wt %.

3. The method of claim 1 wherein the refining element is added at an addition rate of up to 2400 ppm.

4. The method of claim 1, wherein the hydrogen storage material has a refined eutectic structure with twinning in a magnesium-nickel intermetallic phase.

5. An alloy consisting essentially of:
   a hypoeutectic magnesium nickel alloy having a primary crystallized Mg phase;
   greater than zero and up to 20 wt % Ni;
   greater than zero and up to 2 wt % of a refining element, the refining element having an atomic radius in the range of 1 to 1.65 times the atomic radius of magnesium;

the refining element being at least one element selected from the group consisting of Zr, Na, K, Ba, Sr, Rb, and Cs;

wherein Zr is only used in combination with at least one other element from said group;

the balance magnesium and incidental impurities.

6. The alloy of claim 5 wherein nickel is present in an amount of 10-20 wt %.

7. The alloy of claim 5 wherein the refining element is present at greater than zero and up to 2400 ppm.

8. The alloy of claim 7, wherein the refining element is Na present at an addition rate of from 600 ppm up to 2400 ppm.

9. The alloy of claim 7 having a maximum hydrogen absorption capacity at 250° C. of 1 percent greater than cast magnesium alloys unmodified by the presence of the refining element where the alloys are reacted under the same reaction conditions and limited reaction times.

10. The alloy of claim 5, wherein the alloy as cast has a refined eutectic structure with twinning in a magnesium-nickel intermetallic phase.

11. The alloy of claim 10 having eutectic spacings below 1 µm.

12. A hydrogen storage material formed from a cast magnesium-nickel alloy including:
an alloy being a hypoeutectic magnesium-nickel alloy having a primary crystallized Mg phase;
greater than zero and up to 20 wt % Ni;
greater than zero and up to 2 wt % of a refining element, the refining element having an atomic radius in the range of 1 to 1.65 times the atomic radius of magnesium;
the refining element being at least one element selected from the group consisting of Zr, Na, K, Ba, Sr, Rb, and Cs;
wherein Zr is only used in combination with at least one other element from said group;
the balance magnesium and incidental impurities.

13. The hydrogen storage material of claim 12 wherein the nickel content of the hypoeutectic magnesium nickel alloy is 10-20 wt %.

14. The hydrogen storage material of claim 12 wherein the refining element is present at greater than zero and up to 2400 ppm.

15. The hydrogen storage material of claim 12 having a maximum hydrogen absorption capacity at 250° C. of 1 percent greater than hydrogen storage materials containing cast magnesium alloys unmodified by the presence of the refining element where the alloys are reacted under the same reaction conditions and limited reaction times.

16. The hydrogen storage material of claim 12, wherein the alloy as cast has a refined eutectic structure with twinning in a magnesium-nickel intermetallic phase.

17. The hydrogen storage material of claim 16 having eutectic spacings below 1 µm as cast.

18. A method of modifying the hydrogen absorption and/or desorption characteristics of a hypoeutectic magnesium nickel alloy including the steps of:
adding to a hypoeutectic magnesium-nickel melt containing greater than zero and up to 20 wt % Ni, up to 2 wt % of a refining element under a non-oxidising atmosphere, the refining element having an atomic radius within the range of 1-1.65 times the atomic radius of magnesium; and
the refining element being at least one element selected from the group consisting of Zr, Na, K, Ba, Sr, Rb, and Cs;
wherein Zr is only used in combination with at least one other element from said group, and
casting the melt to produce the modified magnesium-nickel alloy having a refined eutectic structure with twinning in a magnesium-nickel intermetallic phase.

19. The method of modifying the hydrogen absorption and/or desorption characteristics of a magnesium nickel alloy of claim 18 wherein the magnesium-nickel melt contains nickel within the range of 10-20 wt %.

20. The method of modifying the hydrogen absorption and/or desorption characteristics of a magnesium nickel alloy of claim 18 wherein the refining element is added at an addition rate of greater than zero and up to 2400 ppm.

21. The method of modifying the hydrogen absorption and/or desorption characteristics of a magnesium nickel alloy of claim 18 wherein the refining element is Na present at an addition rate of from 600 ppm up to 2400 ppm.

22. An alloy consisting essentially of:
a hypoeutectic magnesium nickel alloy having;
greater than zero and up to 20 wt % Ni;
greater than zero and up to 2 wt % of a refining element, the refining element having an atomic radius in the range of 1 to 1.65 times the atomic radius of magnesium;
the refining element being at least one element selected from the group consisting of Zr, Na, K, Ba, Sr, Rb, and Cs;
wherein Zr is only used in combination with at least one other element from said group; and
the balance magnesium and incidental impurities; and
wherein the refining element increases the amount of internal interfacial areas within the alloy.

23. The alloy of claim 22 wherein nickel is present in an amount of 10-20 wt %.

24. The alloy of claim 22 wherein the refining element is present at greater than zero and up to 2400 ppm.

25. The alloy of claim 22, wherein the alloy as cast has a refined eutectic structure with twinning in a magnesium-nickel intermetallic phase.

26. A hydrogen storage material formed from a cast magnesium-nickel alloy including:
an alloy being a hypoeutectic magnesium-nickel alloy having;
greater than zero and up to 20 wt % Ni;
greater than zero and up to 2 wt % of a refining element, the refining element having an atomic radius in the range of 1 to 1.65 times the atomic radius of magnesium;
the refining element being at least one element selected from the group consisting of Zr, Na, K, Ba, Sr, Rb, and Cs;
wherein Zr is only used in combination with at least one other element from said group; and
the balance magnesium and incidental impurities; and
wherein the refining element increases the amount of internal interfacial areas within the material.

27. The hydrogen storage material of claim 26 wherein the nickel content of the hypoeutectic magnesium nickel alloy is 10-20 wt %.

28. The hydrogen storage material of claim 26, wherein the alloy as cast has a refined eutectic structure with twinning in a magnesium-nickel intermetallic phase.

* * * * *